G. W. W. MATTSON.
AUTOMATIC WEIGHING TRUCK.
APPLICATION FILED JUNE 22, 1914.
1,237,361.
Patented Aug. 21, 1917.
3 SHEETS—SHEET 3.
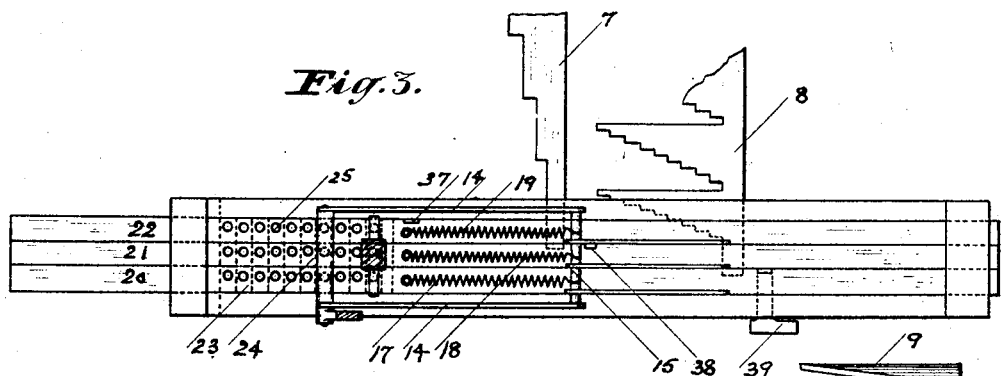
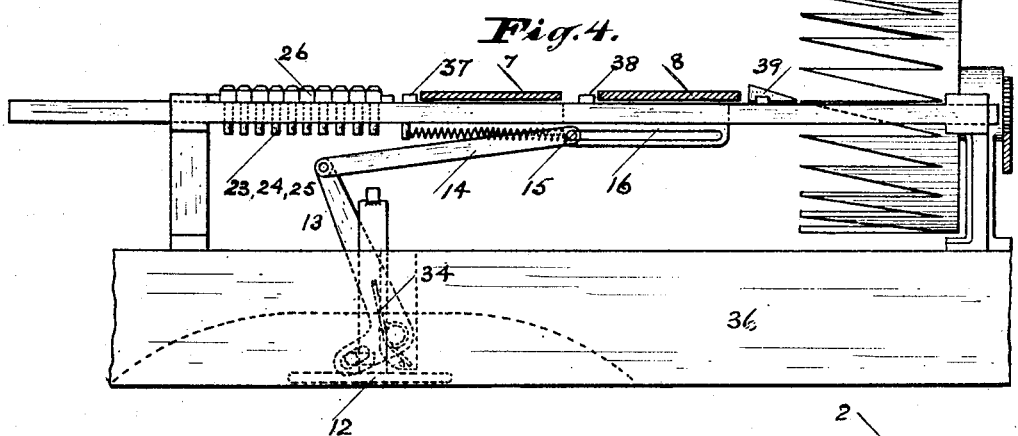
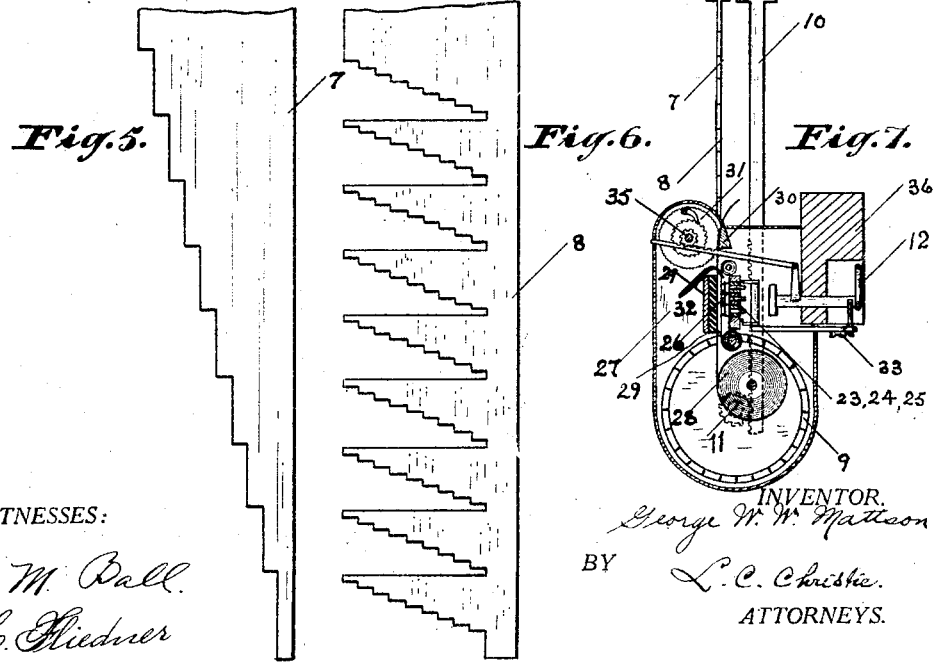
WITNESSES:
G. M. Ball.
F. C. Fliedner.
INVENTOR.
George W. W. Mattson
BY
L. C. Christie.
ATTORNEYS.

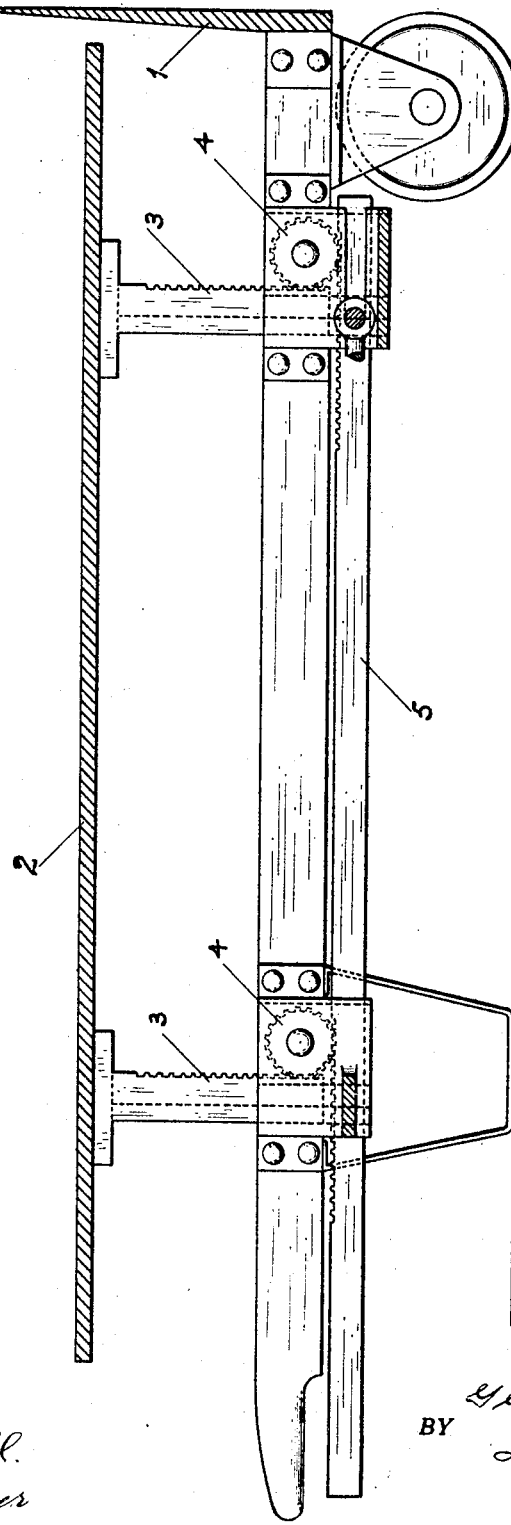

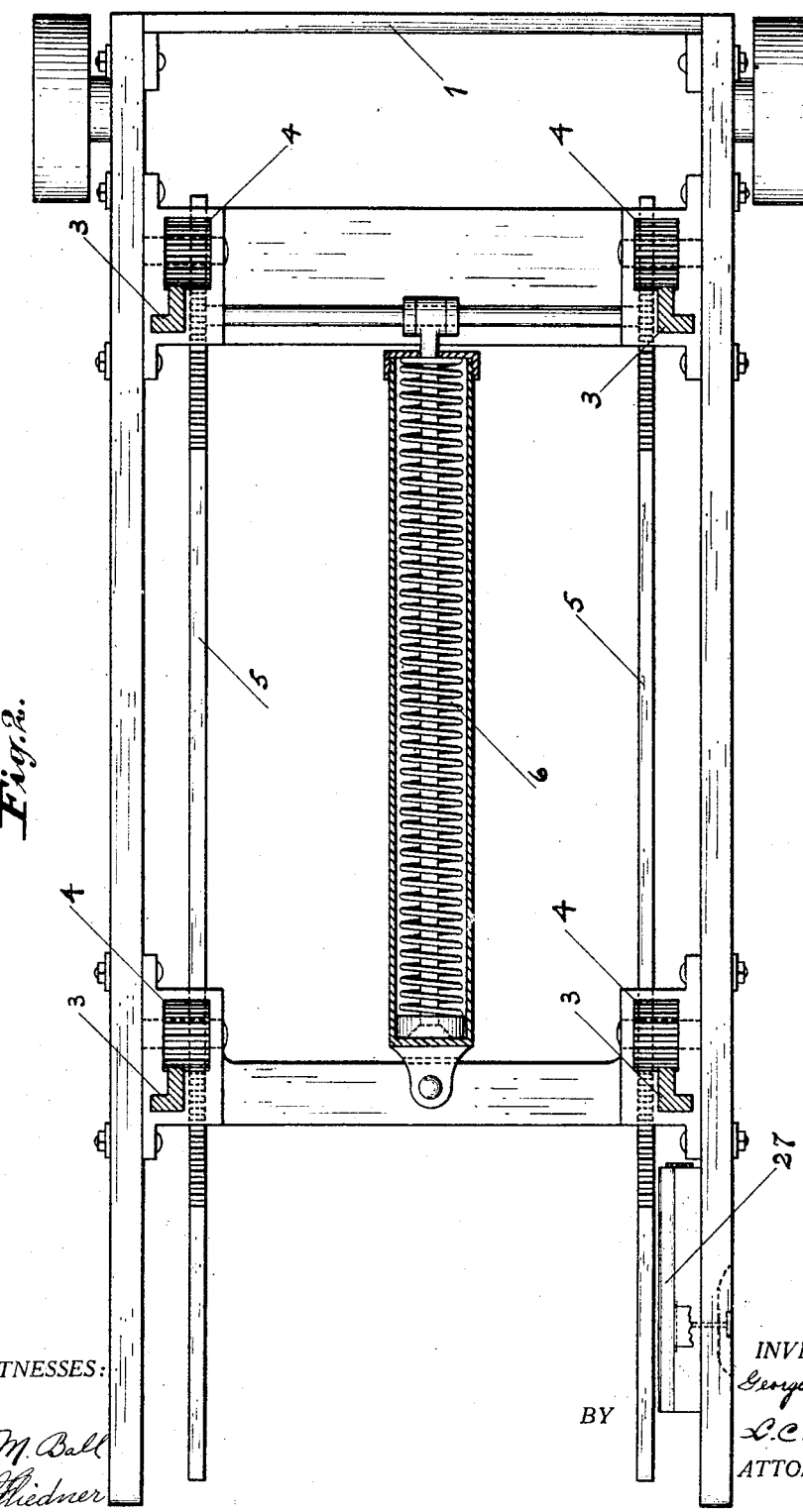

UNITED STATES PATENT OFFICE.

GEORGE W. W. MATTSON, OF SAN FRANCISCO, CALIFORNIA.

AUTOMATIC WEIGHING-TRUCK.

1,237,361. Specification of Letters Patent. Patented Aug. 21, 1917.

Application filed June 22, 1914. Serial No. 846,420.

*To all whom it may concern:*

Be it known that I, GEORGE W. W. MATTSON, a citizen of the United States, and resident of San Francisco, in the State of California, (whose post-office address is 166 Park street, San Francisco,) have invented new and useful Improvements in Automatic Weighing-Trucks, of which the following is a specification.

My invention relates to improvements in "automatic weighing trucks" adapted to use in connection with any weighing station where a true record of weights is usually kept.

The object of my invention is to provide a truck, which automatically will at the same time as a package of goods is delivered present in printed form the exact weight of said package of goods.

My invention consists of any ordinary truck so arranged and adapted by certain accessories and registering devices as will effect a simultaneous presentation of weights of goods carried on said trucks with the delivery of said goods.

In reference to the sheets of drawings forming part of this specification, the mode of operation will be fully and clearly set forth and similar numbers of reference indicate like parts.

Figure 1 illustrates a side elevation of an ordinary hand truck, surmounted by a receiving platform for goods.

Fig. 2 is a plan view of Fig. 1.

Fig. 3 illustrates mechanism in elevation, whereby the registered weights of packages of goods are effected.

Fig. 4 is a plan view of same.

Fig. 5 and Fig. 6 are extended and special views of certain details pertaining to registration mechanism.

Fig. 7 illustrates the method of printing and registering weights and how same are automatically delivered to be torn off and entered in record books, usually kept at any weighing station.

Now referring to Fig. 1, an ordinary hand truck (1) is shown in elevation constructed as is usual, although it must be clearly understood, that I do not confine myself to this particular hand truck, but any truck whether moved by hand, by horses or other motive power must come within the scope of the present application. The frame of truck (1) is surmounted by a flat platform (2) or any other shaped receptacle for goods in the form of barrels, boxes or the like.

Attached to said platform are gear-racks (3) forming at the same time supports and guides for said platform (2) or receptacle. These gear-racks (3) mesh with gear-wheels (4) and said gear-wheels (4) are also gearing with a pair of horizontal racks (5) with which is connected the spring 6, through the intermediate cross shaft 40 uniting the horizontal racks 5. Thus is the vertical movement of said platform or receptacle converted into a horizontal one and this horizontal movement is opposed by the action of a compression spring (6), and thus will the platform or receptacle assume its normal position after goods have been deposited or emptied from same by reason of the resilience of said spring (6).

The registering of weights is effected by the goods themselves, as they are resting on receiving platform (2). To this platform (2) are attached notched plates (7) (8) and the like; these plates (7) (8) and the like are notched thus that according to depression of platform (2) by reason of the weight of goods deposited on same, the plates (7) (8) and the like will assume a corresponding position, the movement of platform (2) by above reason will also operate the notched wheel 9 causing it to have a revolution according to depression of platform (2) by means of a gear-rack (10) attached to said platform (2) gearing with a wheel (11) mounted on the same spindle as supports the notched wheel (9). When now pressure is brought to bear on button (12), referring to Fig. 4 the bell crank lever (13) will move the link (14) and said link (14) having a pin (15) at its end will be guided by same in a slotted aperture (16). Attached to said pin (15) are seen three springs (17), (18) and (19); these springs (17), (18) and (19) are by suitable pins or bolts attached to the sliding bars (20), (21) and (22). The bell crank lever 13 will readily assume its original or inactive position by means of spring 34, mounted on its turning fulcrum.

Attached to these sliding bars (20), (21) and (22) are freely sliding pins (23), (24) and (25) with enlarged heads and these heads carry suitably engraved numerals denoting weights. As now the button (12) is pressed it will transmit this pressure to said freely sliding pins (23), (24) and (25) and cause an imprint to be effected; see Fig. 7 to more clearly illustrate this method of effecting an imprint of the different weights reference to Fig. 7 is made. The device (27) here illustrated is composed of a paper roll (28); the paper strip mounted on said roll is carried on the inside of a resistance piece (29) and between a stationary piece (30) and the slightly corrugated wheel (31); as the button (12) presses against the sliding pins with engraved heads (26) the tape (32) suitably prepared with printers' ink is imprinting on paper strip carried by roll (28) the respective weights of goods carried by platform (2); as the button (12) with its elongation is caused to return to its normal or inactive position by reason of spring (34), Fig. 7, it will by means of link-rack gearing with pinion (35) cause the corrugated wheel (31) to feed or pull the paper strip as carried by roll (28); the imprinted weight can thus be readily torn off and entered as wanted.

It must be understood that this device is open to considerable modification and I do not wish to be understood as claiming this particular device, but any method found simple and practical will be utilized in effecting a perfect registration of weights carried by above trucks.

It is seen that in the illustration Fig. 3 only three bars numbered respectively (20), (21) and (22) are shown; thus units, tens and hundreds only may be utilized. Further extension may at times be advisable and the method illustrated lends itself readily to this, wherefore, I must distinctly assert that I do not curtail or limit myself to above, but wish to claim any practical extension of above method.

The pieces numbered respectively 37, 38 and 39 and attached to sliding bars 20, 21 and 22 will by movement of said sliding bars be carried up against notched plates 7, 8 and wheel (9) respectively carried by the platform 2, the extent to which the latter is depressed determining the positions these stop devices occupy and hence the extent to which the sliding bars may be moved.

The hatched feature of Fig. 7 marked by the numeral (27) simply means a protective casing around the moving parts of mechanism, and the hatched section marked (36) is an end view of one of the arms of above truck (1).

It will be seen, particularly by reference to Fig. 2, that the means for controlling the mechanism by which a record is made of the weight placed upon the platform 2 are carried by one of the handles 41 of the truck. A distinct advantage is incident to this arrangement because the truck must be at rest and supported in a horizontal position as indicated in Fig. 1 when the load upon the platform is weighed, in order that the weight may act upon the weighing devices on vertical lines; and before the load thus weighed can be moved the handles 41 must be grasped, preparatory to raising them; and when this is done, and simultaneously therewith, the button 12 may be pushed by a finger of one of the hands used in grasping the handles 41 and a record of the weight then made. It will thus be seen that the making of the record soon becomes practically automatic to the person using a truck, and does not require either time or extra movement to effect it.

The parts designated 7, 8 and 9 are adjustable stops for determining the extent to which the slide bars, 20, 21 and 22, carrying the printing devices, may be moved; and that of these stops the wheel 9 controls the movements of the units bar 20, the notched bar 8 controls the movements of the tens bar 21, and the notched bar 7 the movements of the hundreds bar 12. I prefer for the units stop a wheel with long teeth, such as shown in Fig. 4, the faces of the teeth on one side being inclined and arranged to be engaged by the contact piece 39, having also an inclined face. The stop 8 for the tens bar is a plate provided with a series of teeth, each of which is again notched or provided with a succession of ten stops arranged along a diagonal line; while the stop piece 7 for the hundreds bar is notched regularly and along an inclined line, the distance between the notches being equal to the distance between the main or larger teeth of the bar 8.

Having thus described my invention, what I claim and desire to secure by Letters Patent is:

1. In a weighing truck, the combination, with a hand truck, of a movable platform carried thereby, weighing mechanism connected with the said platform, printing devices for making records of the weights of the articles weighed, means connected with the weighing mechanism by which the setting of the printing devices is controlled, and means supported by one of the handles of the truck in position to be readily operated when such handle is grasped, for operating the printing devices.

2. In a weighing truck, the combination, with a hand truck, of weighing mechanism carried thereby including a movable platform, printing devices for making records of the weights of the articles weighed, means connected with the weighing mechanism by which the setting of the printing devices is controlled, and means supported by one of the handles of the truck in position to be readily operated when such handle is grasped, for setting the printing devices and also operating them to cause a printed record to be made.

3. The combination with weighing mechanism, of a set of sliding bars for units, tens, hundreds, etc., each carrying printing devices, a set of stops connected with and operated by the weighing mechanism, the stop for the units bar being a wheel with long teeth having inclined faces, the stop for the tens sliding bar being a toothed bar the separate teeth of which are themselves formed with graduated stops, and the stop for the hundreds sliding bar being a graduated bar, and means for forcing the said sliding bars against the stops to bring the printing devices into printing position after the stops have been set by the weighing mechanism.

4. The combination with weighing mechanism, of a set of stops connected with and moved thereby, a set of sliding bars for units, tens, hundreds, etc., carrying printing means whose movements are controlled respectively by the said stops, manually controlled means for moving the said sliding bars against the stops after the latter have been set by the weighing mechanism, including a yielding connection with each bar, and means also connected with the said manually controlled means for causing a record to be made from the printing devices after they have been brought to printing position by the movements of the said sliding bars.

In testimony whereof I affix my signature in the presence of two witnesses, this seventeenth day of June, A. D. 1914.

GEORGE W. W. MATTSON.

Witnesses:
G. M. BALL,
F. C. FLIEDNER.

Copies of this patent may be obtained for five cents each, by addressing the "Commissioner of Patents, Washington, D. C."